Dec. 1, 1931.  M. F. HILL  1,833,993
METHOD OF MAKING INTERNAL ROTORS
Filed Aug. 24, 1928
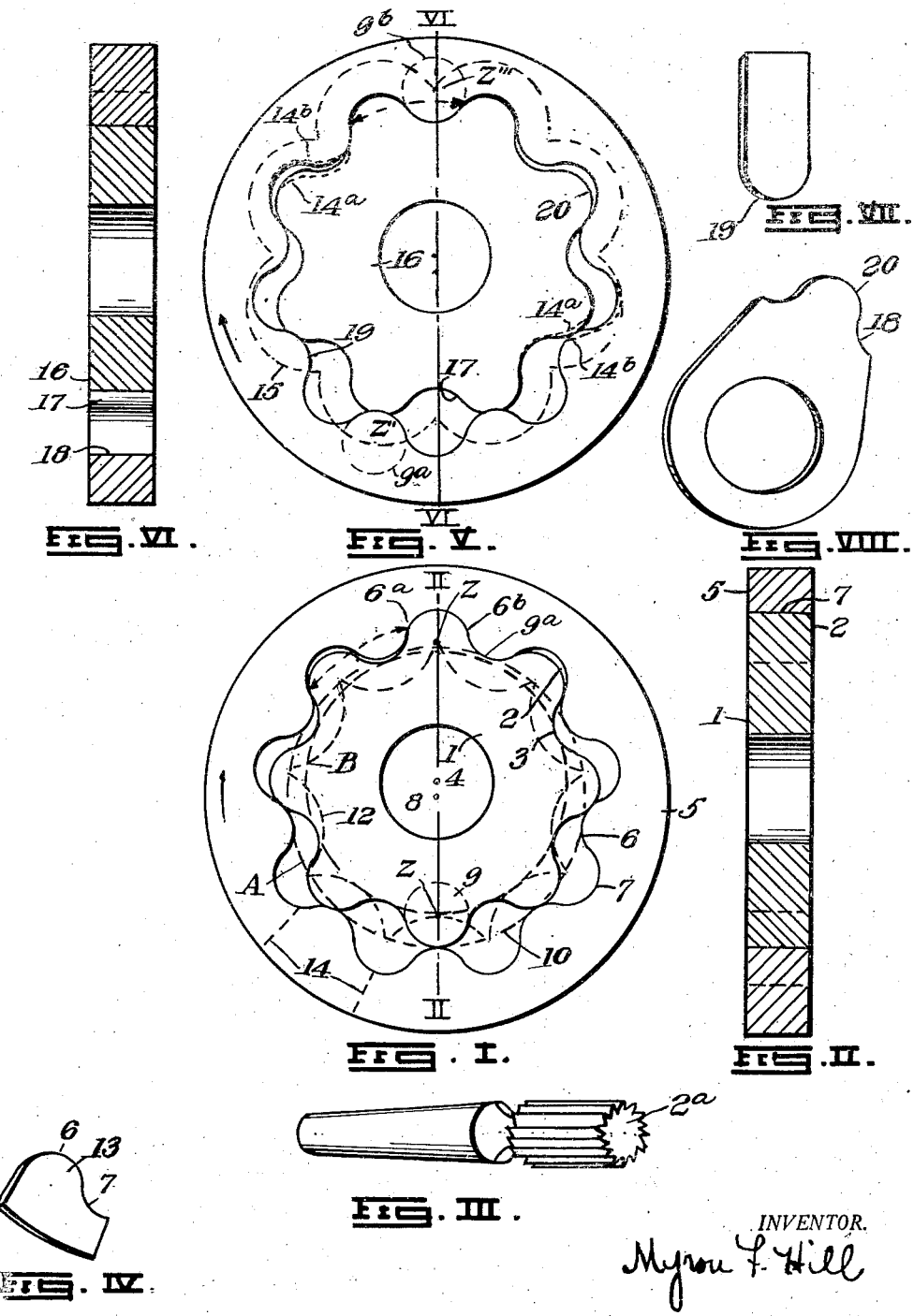
INVENTOR.
Myron F. Hill Patented Dec. 1, 1931

1,833,993

UNITED STATES PATENT OFFICE

MYRON F. HILL, OF LANSDOWNE, PENNSYLVANIA

METHOD OF MAKING INTERNAL ROTORS

Application filed August 24, 1928. Serial No. 301,880.

This case is in part a division of my application No. 513,075, filed Nov. 5, 1921, which as to the invention herein contained was a continuation of my application No. 474,494, filed June 14, 1921; and in part a division of my application No. 619,292, filed Feb. 15, 1922. It also contains matter not described in said applications or any other heretofore filed by me.

My invention relates to internal rotors (the trade name being Gerotors, as branded by a manufacturer); that is, two gears or rotors, one within the other having tooth divisions, one having one less tooth division than the other and the teeth of each travelling at steady angular velocity and continuously sliding in contact over the contour of the other.

My invention relates to the method of making such rotors, and to a specific variety of curves for them.

In general, the method is put into effect, after selecting the sizes of pitch circles proportional to the numbers of rotor tooth divisions, and the size and form of a master tooth or tool form, by mounting the master tool or form on means to revolve it around the center of a first pitch circle while it cuts a blank rotating about the center of a second pitch circle at a relative speed properly proportional, without variation, to the numbers of teeth. This generates one rotor.

In place of the first rotor there may be substituted a tool blank provided with enough steel for one or more tooth divisions (for one convex tooth form is enough) and the same tooth form generated as on the first rotor. After hardening, this tool may be used to generate the second rotor on a blank mounted for the purpose on the first center. Circular convex forms like that of the master tool and generated concave tooth spaces if desired, may then be generated, the tool following the path of a tooth of the first rotor as it rotates with the contours formed on the blank at steady angular speed of the tool and blank.

The convex tooth forms of this second rotor were in reality assumed when the master curve was decided upon.

In other words, the contours have geometrical outlines produced by three elements, namely, two rolling circles and a master curve, assisted by a fourth derivative element, a mating curve.

Let two circles be located upon a plane, one within the other and tangent to it. Let their diameters be in proportion to the number of tooth divisions selected for the two rotors which should differ by one. A master curve to represent the desired tooth form of a rotor (either rotor) is selected to start the curve generation with and preferably located upon the radius of the circle representing the continuous effect of that rotor whose tooth form it replaces.

If the master curve (or the mating curve) is located upon the radius of the inner circle it may have convexity upon its outer side and if located upon the radius of the outer circle it may have convexity upon its inner side. One circle is rolled with the other without slip at the point of tangency which results in steady angular motion of one with relation to the other determined by their relative diameters or in the inverse ratio of the numbers of tooth divisions, and the master form may be outlined in a series of successive positions which it assumes with relation to the second circle. A curve drawn along the crests of such outlines is a curve of envelopment which is the contour that is sought for one rotor element. A portion of the contour, which may be called the mating curve is then carried by the radius of this second circle, as the rolling action is continued in the same way, and its form in every successive position with relation to the first circle is outlined; and a curve of envelopment along the crests of the curves so outlined is the contour of the other rotor element.

Applying this description now to the specific embodiment of my invention, the master curve selected may be a smaller circle, or portion of its periphery, representing the addendum or convex crown of a tooth of the inner rotor. The center is located upon the radius of the inner rolling circle with the center of the arc on or outside the periphery, depending upon its size and shape. The two circles, with the radius of the inner circle carrying this master curve, are then rolled, one with the other, and the position of this master arc traced in each successive position which it assumes with relation to the other circle. This inner circle may rotate nine times while the outer circle rotates eight times or at speeds inversely proportional to number of teeth selected. This relative speed not being varied has a steady angular motion. The contour or outline of the nine tooth rotor, the outer rotor, is the curve of envelopment traced along the crests of these traced curves.

In such a case the portion of this curve of envelopment, having a convex side toward the center of the rolling circle is the "mating curve." For complete curve generation it comprises the entire convex portion of a tooth division. It is located upon the radius of the outer circle in its outlined or generated position and the two rolling circles again rolled in the same way and the mating curve is traced in all its successive positions with relation to the inner circle. If the outer circle rotates eight times the inner circle rotates nine times, thus rotating at speeds inversely proportional to the number of tooth divisions of the two rotors. A curve of envelopment is then drawn through the crests of these traced curves which is the contour or outline of the inner rotor element. Such rotors cooperate in the manner specified.

A convenient method of laying out these curves is to mount the describing curve—either the master curve or mating curve—upon an arm which is swung around the center of the circle to which it belongs and rotate a blank around the center of the other circle and trace upon the blank the describing curve in each of the successive position which it assumes, the arm and the blank rotating upon their centers at speeds inversely proportional to the number of tooth divisions of the rotors.

Instead of rolling both circles, one circle may remain stationary and the other rolled in, or on it, as the case may be, always maintaining the point of tangency without slip. This is equivalent to mounting the circles upon a plane rotating backward on the center of one of the circles, even as fast as that circle rotates forward, thus neutralizing its motion. Nevertheless with relation to such a plane the speeds of the two circles still vary in inverse ratio, or inversely proportional to the numbers of tooth divisions of the rotor elements.

In the mechanical operation of making rotors, the two rolling circles mentioned are the pitch circles of the actual rotors which vary in diameter in proportion to the numbers of tooth divisions. The master curve selected may be the form of a milling cutter having cutting edges upon its outer diameter. The mating curve has the characteristic of a convex portion of the tooth of the outer rotor and preferably its generated position upon the pitch circle. The two pitch circles and the master milling cutter determine the contour of the outer rotor and therefore of the mating curve. That is, the mating curve is determined by those three elements.

A blank for the outer rotor is selected with a hole in it to clear the tooth positions so that there is material left from which to form the teeth. It may be mounted in a milling machine in which the milling cutter is carried upon a fixed axis which corresponds to holding the inner pitch circle in fixed position as above described. The mechanic is supplied with figures to shift the table vertically and horizontally between cuts, so that with relation to the blank the cutting edges of the milling cutter follow the successive positions of a tooth of the inner rotor. When both circles rotate, the axis of the milling cutter rotates around the pinion axis as the blank rotates around the other axis. But when the inner circle is fixed the pinion axis is also fixed, and the blank rotates on its axis, and the axis of the blank rotates around the pinion axis. In either case the resulting curve is the same as hereinbefore described. If the rotors are of the size shown in Fig. 1 twenty successive cuts from the top of a tooth to the bottom of the next tooth space, repeated for all the other teeth and tooth spaces; and twenty cuts from this bottom position of a tooth space to the top of the next tooth similarly repeated will form the contour of the outer rotor. The surfaces have minute serrations which are removed by wearing the rotor into its mate.

The pinion rotor contour is then to be formed. A shaping cutter or "mating" tool is then made preferably having the contour of the convex portion of the tooth form of the outer rotor and mounted in a so-called "shaper," and a blank slightly larger than the outside diameter of the pinion or inner rotor is mounted on the table of the "shaper." The mechanic is supplied with figures for rotating the blank by means of an index, and figures for setting the table in a series of horizontal and vertical positions and in each position the mating tool cuts the blank. Such positions are the positions of the tooth form of the outer rotor with relation to the contour of the inner rotor. Twenty such positions from the top of a tooth of the inner rotor to the bottom of the next tooth space and twenty more from that point to the top of the next tooth, repeated for all teeth and tooth spaces, by indexing the blank provide the contour or outline of the inner rotor. This method corresponds to the geometrical description above noted in which the inner circle is held stationary and the outer circle rolled upon it without slip at the point of tangency. The screws that adjust the tables of the machine employed for generation as in a milling machine or shaper are supplied with micrometer divisions, so that accurate settings are possible. A milling machine may be used for the master tool and a shaper for the mating tool.

It is apparent to a mechanic that rotors so made fit so tightly one without the other that rotation is different, and one rotor has been worn into the other by an operation which may be called "burnishing" which wears off the minute serrations of excess metal between the cuts so that the rotors work freely together and maintain the contacts between their contours in the region of tangency of the pitch circles, which is usually (in gear parlance) termed "full mesh;" and in the region opposite where the pitch circles are farthest apart usually termed "open mesh;" which are utilized in fluid mechanisms to keep the pressure in one passageway from leaking through the teeth over into the other passageway. In both full mesh and open mesh regions this contact is travelling and continuous during rotation, so that as the teeth shift in their relative positions with each other and the tooth spaces, they do not recede from each other at points which would permit a substantial dissipation of pressure from a high pressure passageway or port over into a low pressure passageway or port. My contours with their steady angular velocities maintain fluid tightness between the ports in these regions so that high mechanical and volumetric efficiencies are made possible.

Whatever the master curve, and whatever the contour system it creates, this continuous travelling fluid tight relation both at full mesh and open mesh regions is maintained though in some uses of my invention the full mesh contact is sufficient.

If the diameter of the milling cutter is $\frac{7}{16}$th (of any unit of measurement) its center should lie .023 more or less, outside of the base or pitch circle, when there are eight tooth divisions of the form shown on the inner rotor, and nine tooth divisions on the outer rotor. The pitch circles vary as 8 to 9, the inner circle having a radius of 8 units, and the outer a radius of 9 units. Their diameters being 16 and 18 units respectively, which is proportional to the number of tooth divisions selected for the rotors.

When one rotor is "burnished" into the other as described, it is apparent that a tooth of one rotor makes such close engagement with the contour of the tooth space of the other rotor in the full mesh region, that the travelling engagement substantially preventing leakage is realized, and in use there is always at least one point of contact or engagement of the nature specified between the rotor contours substantially preventing leakage in this region from one port to the other.

If the master form, or milling cutter, represents the tooth of the outer rotor and the mating curve represents the tooth form of the inner rotor, the inner rotor is of course generated first by the master form, and then the mating tool may be also generated so that it has the form of a tooth of the inner rotor, and this mating tool then generates the outer rotor by the same method above described.

In the drawings:—

Fig. I illustrates a pair of rotors and the pathways of the teeth with relation to one another in a specific curve system described.

Fig. II is a section of the rotors on line II—II, Fig. I.

Fig. III is a master tool of the form selected for this specific system.

Fig. IV is a mating tool for the same system.

Fig. V illustrates another specific variation of my method.

Fig. VI is a section of the rotors in Fig. V on line VI—VI.

Fig. VII is any form of master tool selected to start with, to generate one rotor with.

Fig. VIII is a mating tool generated by the master tool in Fig. VII.

One specific form of my method of making rotor curves is as follows:

A pinion rotor 1, Fig. I, is provided having teeth 2 and tooth spaces 3, and is centered upon an axis 4. It is eccentric to and works inside of an annular rotor 5 having teeth 6 and tooth spaces 7 and centered at 8. A tooth and tooth space of a rotor constitute a tooth division in this form of rotor, though a tooth division may not be limited to this idea.

The pinion teeth as well as tooth spaces 2 and the annular teeth 6 are provided with curves that make possible an engagement theoretically at all points where the teeth project toward each other, and in practice during either an opening phase from full mesh to open mesh, or the reverse, depending on whether the pinion drives the annular rotor or vice versa. The exception of this contact between a given pair of teeth is at full mesh shown at the top of Fig. I where, in the particular curve system shown, a pinion tooth shifts from one annular tooth 6a to the next one 6b.

An annular tooth, in this particular curve system known geometrically as "phydocroid," takes time to roll over a pinion tooth space as it crosses full mesh, passing from one pinion tooth to the next one.

A pinion tooth 2 travels over an annular tooth division 6, 7, during one complete rotation about the pinion axis. These specific tooth and tooth space relations in Fig. I may be secured by providing the pinion teeth with convex surfaces of approximately circular form or a form generated in reverse from a circular master curve.

The eccentric rotor axes are of course, located with proper pitch circles A and B, upon which the rotors are designed, touching at one point, as in ordinary gear design, the inner pitch circle A for eight tooth divisions has a radius equal to eight times the distance between the centers of the two pitch circles; and the radius of the nine tooth pitch circle has a radius of nine times the same eccentricity.

A milling cutter of an approved size is selected as a master tool. In the particular curve system shown in Fig. I, the master tool milling cutter 2a (Fig. III) is adapted to cut the teeth 6 and tooth spaces 7 of the annular rotor 5. The milling cutter is started rotating at cutting speed in the position of a tooth of the pinion as indicated at 9 for example; an annular blank being provided having a hole indicated in broken lines 10 (tho other places may be used for starting the milling operation such, for example, as drilling a hole in some tooth position—9a for example—where the mill may start cutting the curve, and entering the mill into the hole). The mill is then rotated at cutting speed upon its axis z, in the position of the tooth of the pinion, 1, with the axis z lying outside of the pinion pitch circle B, and revolved around the pinion axis 4 while rotating the annular blank around its eccentric axis 8. In this particular instance, if the axis of the mill should lie in the pitch circle it would have the effect of a looped trochoid and cut away the driving contacts needed at full mesh (see Kinematics of gerotors, infra, Chapters VI and VII). The distance of the mill axis from the pitch circle has been termed the "Curtate addition" and varies with the size of the mill, under otherwise equal conditions. It is determined by trial cuts. If the speed of rotation of the mill around the pinion axis—the same as a pinion tooth around that axis—and of the annular blank around its axis vary for instance, as 9 to 8 respectively, the annular blank after nine such rotations, will have nine teeth. A pinion having teeth with convex curves corresponding to the mill, will rotate harmoniously with the annular rotor so generated,— so far as the pinion convex tooth contours are concerned. The pinion contour remains to be determined.

The annular surface thus has generated curves 6, 7, parallel to hypocycloids, or rather to a variety of hypocycloids termed curtate trochoids, shown at 12, the axes of the pinion teeth and mill describing such curves. I term these particular trochoids "circroids" and the rotor contours in Fig. I, "phydocroids" (see "Kinematics of gerotors" by the applicant on file in the U. S. Patent Office library and elsewhere).

Any other plurality of teeth may be used.

The contour of the pinion may in turn be generated by means of a mating shaper tool having the form of a tooth and/or tooth space of the annular rotor. A blank of tool steel may be substituted for the rotor blank, 5, of the same size and shape and, a single tooth 6, and tooth space 7, generated in the same way as the annular blank; and the mating tool 13, Fig. IV, cut out of said blank as indicated at broken lines 14, Fig. I. The convex curve of such a mating tool is not circular when the master tool is circular or as described. The tool 13, or rather its convex portion, generates curves on the pinion that mate with the annular rotor. This mating tool is shifted, that is, shifted around its center, preferably between cuts, about the pinion blank to assume the various positions that a tooth and tooth space of the annular rotor assumes about a pinion. The convex portion of the mating tool, during this operation, generates a tooth space 3, and may in practice generate the whole pinion curve though the convex pinion curves 2, were fixed by selecting the size of the mill and locating it at the point z. The number of pinion teeth, too, were assumed.

The axis z, of the master milling cutter and of the pinion tooth, should be just enough outside of the pitch circle to form the good working curve above described and not undercut the contour at the sides of the teeth spaces thru too sharp cusps in the trochoids 12. These cusps should be kept sufficiently blunt for this purpose. By shifting the axis of the cutter toward the center, the cusps are sharpened. By shifting it away from the center the cusps are rendered more blunt, a fact well known about trochoids. The degree of bluntness determines the roundness of the curves.

And the mating cutter representing the curve of an annular tooth and tooth space if desired—mounted in a shaper (a modified Fellows gear shaper for example), to shape the pinion teeth and tooth spaces, generates the pinion blank which is caused to assume the positions relative to the mating curve that the corresponding portions of the pinion curve assume to the corresponding portions of the annular rotor curve (or one of its teeth). If a concave curve of one rotor is used as a master form to generate the contour of the other rotor with it generates only the convex contour of the mating teeth. This convex contour may however then be used to generate the entire contour of the other rotor, and its tooth form used as the mating tool as before. A convex portion of a tooth of one rotor may also be used to start generation with as has been described. Or a whole tooth division of one rotor may be employed either as master or mating tool or both.

To sum up the mutually generative relation with steady angular velocity, the teeth and tooth spaces of either rotor may be generated from the form of teeth of the other, and the tooth spaces (and whole contour) of the other rotor may be generated from the form of the tooth of the first rotor to be generated.

Variations of my method lying within its scope are possible. Instead of starting with a circular master tool form representing a tooth of the inner rotor, the master tool may represent the form of an annular tooth division on the outer rotor as illustrated in Fig. V. Various master forms may be employed beside circular ones, such as ovals of different form including a cycloid, either a simple cycloid or a trochoid or a curve parallel to a trochoid or other form. Ellipses, and conic sections of well known forms, and modifications of them, as well as irregular and compounded forms of different curves may be employed. In each case, except with simple cycloids, the distance of the axis $z$ outside of the pitch circles A, B,—which may be called the curtate addition—has to be determined. Experiment with different distances soon indicates the best curtate addition to produce contours with continuous sliding contacts where desired as above described. In Fig. I the pitch circle and hole 10 seem to coincide, but this is not necessarily so.

Some slight degree of lost motion between the pinion and annular rotor at times may be desirable for free action, that is, portions of the curves which have no needed function— as at 14$a$, on the pinion, or any part of it, and portion 14$b$ on the annular rotor, or such parts thereof as are not needed for continuous contact, depending on the application of my invention,—may be varied—that is, worn off, or cut into—if desired. The rotor spaces or chambers may thus be joined together on the non-driving side. My rotors may be mounted upon journals, having lost motion such as a fraction of a thousandth of an inch to permit free rotation without injurious heat. When the rotors are first assembled on such journals, the pinion teeth at first ride hard upon the annular teeth at open mesh until the teeth wear free and until the rotors bear upon their journals instead of upon each other. If the annular rotor drives the pinion in the direction of the arrows, the teeth bear against each other from open mesh to full mesh, as on the left side of Fig. I.

If the pinion drives the annular rotor when travelling clockwise, they bear on each other on the right side of Fig. I, from full mesh to open mesh.

Except for the length of a tooth division nearest full mesh, the pressure is reduced between the teeth that bear against each other until it is substantially eliminated, and the teeth assume a pressureless sliding contact that keeps them smooth and brightly polished. This action may be termed "burnishing."

The tooth division, indicated by a double headed arrow, Fig. I, at full mesh is the driving range; and if it wears, the sliding contacts elsewhere are again subjected to pressure until they wear free again to new curves. By such an action the gears wear tight. When subjected to heavy emergency loads, these additional tooth contacts provide reserve driving strength and load sustaining power, as well as add to their durability. This action between the teeth that keeps them tight regardless of wear is of vital importance in working on or by high pressure fluids. These various tooth contacts, when combined in pumps or engines with ports to match the tooth contact action, provide rotor chambers that open and close and are able to perform expansion and contraction pressure functions, such as pumping fluids, or acting as motors, particularly for gases, with high efficiency, both from a volumetric and power standpoint.

In Fig. V, in which the master tool represents the tooth of an annular rotor, the axis of the master tool follows the epicircroid curves shown in broken lines 15, during the generation of the contour 17 of rotor 16. The mating tool thereupon represents a tooth of the pinion rotor and generates curve 18. When the master tool is a simple cycloid, the cycloid is erected on the pitch circle of the rotor of which it represents a tooth (see Kinematics, supra). In such a case the generated teeth of the inner rotor are simple epicycloids, and the generated teeth of the outer rotor are hypocyloids and the tooth spaces are simple hypocycloids, and the generated tooth spaces of the outer rotor are then simple epicycloids.

Whatever the master tool curve in either Fig. I or V, the mating tool has a curve determined by the master tool. And the curves of the two rotors are determined by these tools. It therefore follows that all rotor curves are determined by the master tool.

Without limiting my invention to specific proportions, I find the following effective. For small rotors of the type shown in Fig. 1, using 1 as the standard of measurement, the centers 4 and 8 may be apart 115 thousandths. The radius of the pitch circle A may be 92 hundredths and of B 1035 thousandths. The curtate addition, the distance of the axis of the pinion tooth—or the mill—may be located 23 thousandths outside of the pitch circle A (or less, or more), to cut the outer rotor from. The radius of a tooth, and of the milling cutter 2$a$, may be 2187 ten-thousandths. The axis of the milling cutter describes a star shaped figure of the type shown at 12, in cutting the curves 6, 7.

For curves of the type shown in Fig. V the milling cutter, or tool shown in Fig. VII, has its axis rotating around the center of the outer rotor and is fed toward the center while cutting the contour of the inner rotor until the curve of the latter assumes the form desired. The mating tool curve is made to correspond, and while rotating around the center of the inner rotor is fed outward in the blank for the outer rotor until the inner rotor just pushes into it easily.

When altering master tools or other factors, trial cuts indicate the best diameters,— that is the best curtate addition which should be the same for both rotors of a pair.

In this specification and in the claims, I have made the statement or used the expression that the curves of envelopment upon or by which the contours of the rotors are formed are generated by the tooth form during "regular angular motions" inversely proportional to the numbers of teeth. I mean to indicate by this expression that although the two peripheries travel at the same speed at the place where the teeth engage, they necessarily vary in relative angular displacement, moving as they do on different radii and one having one less tooth than the other. In the ratio of 8:9 for example, the larger rotor would not have completed its revolution by 40° when the smaller had made a complete turn. Necessarily this makes the teeth of one slide on the teeth of the other as the pitch circle of one rolls on the pitch circle of the other; and it is one of the main objects of my invention to so form the curves of envelopment of the two sets of tooth divisions during the working range (which may be either for using or delivering power) that the contours shall continuously maintain travelling contact due to the relative angular displacement specified; on the one hand not permitting any opening or relieving between the tooth divisions of the two rotors through which anything approaching commercial pressures would be immediately dissipated and on the other hand maintaining contact substantially as continuously and with substantially as slight friction as between plane surfaces, so that the teeth burnish one another as they engage and part, and can be efficiently lubricated to form a film which is not removed either by the contact of the metal or by fluid pressure. In practice after the teeth have become burnished no substantial lubrication between them is required for tightness.

While I have described certain specific applications of my invention, it is understood that its scope is not limited to them but embraces such rotor contours and methods of generating them, or their novel aspects, as herein described.

What I claim is:—

1. The method of determining cooperative contours for rotors on blanks, one rotor contour within, having one less tooth division than, and on a different center from the other rotor contour, in which the teeth of one may maintain contact with the teeth of the other at steady angular velocity during relative rotation at a speed determined by their respective numbers of teeth; consisting of causing a selected master form representing the desired tooth portion of a tooth of one rotor contour to describe a mating contour having a difference of one tooth division on a blank for the mating rotor contour by generation during such relative rotation on the centers of said two rotor contours having said difference in numbers of teeth of one; whereby said master tooth form and said mating contour of said blank may maintain continuous contact during said rotation.

2. The method claimed in claim 1 having a second or mating tool form, representing the said generated tooth form of said mating rotor, describe a contour by generation on a second blank during relative rotation of said blank and of said mating tool form on said two centers at said steady angular velocity, whereby the teeth on each of said blanks may maintain continuous contact with the teeth and tooth spaces on the other blank during said rotation.

3. The method claimed in claim 1 having a circularly formed convex shape for said selected master form.

4. The method claimed in claim 1 having a circularly formed convex master tool representing a tooth of the outer rotor.

5. The method claimed in claim 1 having a circular master form representing a tooth of the outer rotor, and having a second or mating tool form representing the said generated convex tooth form of the inner or mating rotor contour describe a contour by generation on a second blank during relative rotation of said blank and of said mating tool form on said two centers at steady angular velocity, whereby the teeth of each of said blanks may maintain continuous contact with the teeth and tooth spaces on the other blank during rotation.

6. The method claimed in claim 1 having a tool form describing by generation a mating contour on a blank for the other rotor capable of maintaining continuous contact with the teeth on the blank for the first rotor, by rotation of said tool form and of said second blank around the centers of two pitch circles having diameters proportioned to a difference of one tooth division at speeds determined by the relative speed of said two pitch circles while tangentially rolling one with the other without slip.

Signed at New York in the county of New York and State of New York this 20th day of June, A. D. 1928.

MYRON F. HILL.